Figure 1:
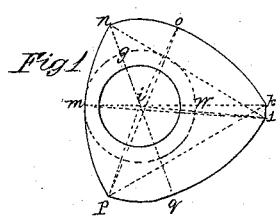

R. Winans,
Steam-Engine Valve-Gear.

Nº 311.  Patented July 29, 1837.

UNITED STATES PATENT OFFICE.

ROSS WINANS, OF BALTIMORE, MARYLAND.

LOCOMOTIVE STEAM-ENGINES ADAPTED TO UNDULATING AND CURVED ROADS.

Specification of Letters Patent No. 311, dated July 29, 1837.

*To all whom it may concern:*

Be it known that I, Ross WINANS, of the city of Baltimore, in the State of Maryland, have invented new and useful Improvements in Locomotive-Engines and other Steam-Engines, which produce a locomotive-engine better adapted to curved and undulating roads than those in present and ordinary use, of which improvements the following is a true specification.

The objects of this improvement are—first,—the adaptation, in a more perfect manner than heretofore, of locomotive engines to curved and undulating roads, or to roads where considerable variation in the power of an engine is required, enabling also the same engine to be used either for the transportation of heavy loads at slow speed, or of light loads at fast speed, and varying the speed and power of the engine as occasion may require, with more facility and to a greater extent and advantage than can be done in the locomotive engines now in use; second a saving in fuel. To accomplish these objects, I connect the moving power with all wheels of the engine for the purpose of obtaining the adhesion of its entire weight. This connection of the power with all the wheels may be accomplished by any of the modes now in common use for the purpose. Together with four or more connected and propelling wheels, I use cylinders, of from thirty to fifty per cent. more capacity, in proportion to the weight of the engine, than the cylinders now used in the United States or elsewhere. For instance; for an engine weighing twenty thousand pounds, I use two cylinders, each containing four thousand cubic inches, making the contents of both cylinders ten thousand cubic inches. An engine, in which this proportion between the size of the cylinders and the weight of the engine is preserved and where the progressive motion upon the rails does not exceed nine or ten feet during a single stroke of the piston, will, at the ordinary pressure of steam in the boiler (say 60 pounds to the square inch) have the ability to work up to the adhesion of the entire weight,—that is to say—it will move forward with any load, that can be taken without the wheels slipping round on the rails, in any state of the rails or of the weather; in other words—if such an engine is made fast to an immovable object, its power will be sufficient to overcome the adhesion upon the rails produced by its weight, and it will turn its wheels round, notwithstanding that it cannot advance. With the connection of the power to four or more wheels, and the use of such cylinders as above described, I combine, the cutting off of the steam, or closing the induction valve at different portions of the stroke of the piston, as occasion may require, say at three eighths, five eighths and seven eighths of the stroke, at pleasure, and while the engine is in motion on the road. By the foregoing arrangement and combination, an engine is produced which, when supplied with a good boiler, is capable of exerting a greater horizontal draft in proportion to its weight, and overcoming steeper grades with effect, than any that have heretofore been built, while the same engine may be used with facility and advantage in the transportation of light loads at the highest speed, thus making it peculiarly adapted to undulating and curved roads where the power that is necessary for the work to be done, and the speed to be attained, varies at different points.

For the purpose of cutting off the steam at different portions of the stroke, I have invented a cam, to give motion to the slide valves, which operates to produce the required effect. The cam invented by me is three times the breadth of the ordinary cam—say six inches. One third of the breadth is so shaped as to open the valve at the proper time at the end and commencement of the stroke, and to close it when the piston has passed through $\frac{3}{8}$ the length of the cylinder. The next third of the breadth of the cam is so shaped as to open the valve at the proper time, as before, and close it again, when the piston has passed through $\frac{5}{8}$ the length of the cylinder. The other third portion of the cam is so shaped, as to open the valve at the proper time, and to close it again when the piston has passed through $\frac{7}{8}$ the length of the cylinder. Or, the cam invented by me may be so constructed and shaped as to cut off the steam at each eighth, or any other portion of the stroke, between $\frac{3}{8}$ and full stroke that may be desired, as will be more fully explained by reference to the accompanying drawings.

The slide valves and valve faces must be so arranged, that the former, in moving upon the latter, shall leave the exhaust P, or eduction passages, open about one fifth of the full opening after cutting off the steam or the closing of the induction passage, just as when the common and single cam is used.

From what is here said it will at once be perceived that my invention consists of a multiplication of common cams upon the same shaft, and the general and sufficient direction to an engineer to enable him to construct my invention, would be to tell him to place as many cams as he wanted cut-offs, side by side, and then give the cam yokes sufficient lateral motion to permit their being applied to any one of the cams at the pleasure of the engineman. In following this direction the engineer would in all probability place the several cams as the eccentrics or cams for forward and reversed motion are now placed in locomotive engines—with the thickness of the cam yoke between them to enable a change to be made from one cam to another, which could not be done otherwise, for the two cams together might present a longer line or diameter than the yokes were made to receive. Such a construction would certainly answer the purpose, and if adopted would in my opinion be an infraction of my patent. Such a construction, however, is not the one that I prefer or use, because of the width laterally that it would occupy, and the wide play that would have to be given to the cam yokes. A cam thus constructed would be ten inches in breadth, or thereabouts, and the play of the cam yokes laterally would, including the reverse motion, be about twelve inches. In the treble cam, however, that I use, as above described, I have no intervals between the separate cams, but place them all close together in the space of six inches, which makes the entire play of the cam yokes including the reverse motion but eight inches. In the shape that I give to the separate parts of the cam used by me, I vary in one respect from the ordinary cams that would produce effects corresponding to such parts respectively. In the common cams the shape is such, that both sides of the yoke are constantly in contact with the periphery of the cam, as will the side against which the cam is pushing as that which it is drawing after it. In giving shape to my cam, I preserve only those projecting points, which, by pushing against the yoke, give it motion, and maintain the longest diameter only opposite to the projections which produce the full, or half, or other stroke, so that it is only when the yoke is pushed to the extent necessary to produce the full, or half, or other stroke, that both sides of it are momentarily in contact with the cam, which prevents the yoke at these points being impelled beyond its required and precise position; and I make the pushing parts (so to speak) of the cams all correspond at the point immediately in contact with the yoke at the instant the steam is let into the cylinders at the crank; passing the dead point; so that, whichever cam is working the slide valve, the steam is let on at the same period of the revolution at the time, or before, the crank is on the dead center. In this way, as will be seen by reference to the accompanying drawing, I avoid the necessity of intervals between the cams, and am enabled to unite them side by side into one cam, with three different projections on one side of it, or more projections, if it is desired to have more than three cut-offs, and in this way am I enabled to move the yoke from cam to cam which would be impossible, were I to place three or more ordinary cams side by side, without intervals between them. The cam yokes, or forms which embrace the cams and communicate motion to the slide valves are of the same description as those used with the common and single cutoff cam—the two yokes belonging to the two cylinders being hung to a shaft or shafts placed across the carriage of the engine, and parallel to the axle or cam shaft, in such manner as to permit their lateral movement to such extent that they may be applied to the different parts of the cams. Both the yokes are of course applied to the same shaft so as to move from one part of the cams to the other simultaneously and apply to corresponding parts on each cam.

With a view to the most perfect explanation, and employing dimensions to facilitate illustration rather than to limit the modes of construction, I will proceed to describe a cam for working the slide valves of locomotive engines, and cutting off the steam at different portions of the stroke of the piston, varying the time of cutting off from one portion of the stroke to another while the engine is in motion.

Figure 3:
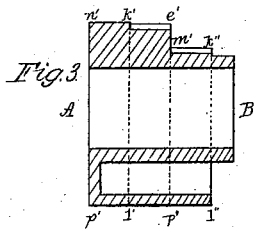
Figure 2:
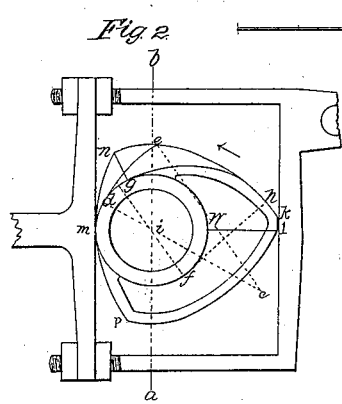
Figure 4:
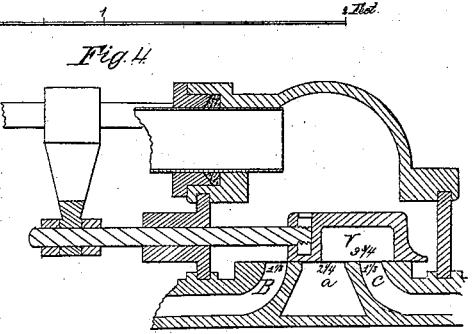
Figure 6:
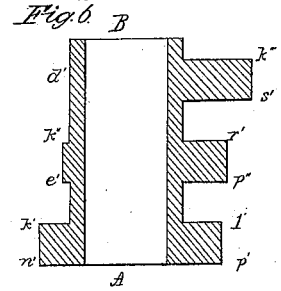
Figure 5:
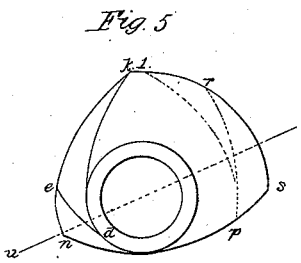
Figure 7:
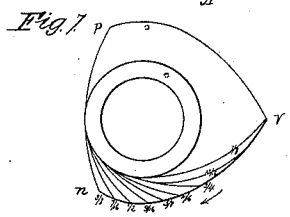
Figure 8:
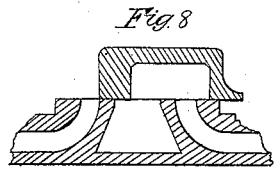
Figure 9:
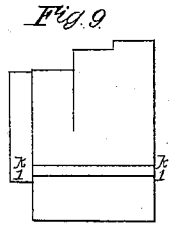

Referring to the drawings, Figure 1, represents the back of the treble cam; Fig. 2, the front of the same; Fig. 3, a section through the line $a$, $b$ of Fig. 2; Fig. 9, an edge view looking on the cam at $k$, $l$; Fig. 4, the steam chest of slide valve corresponding with the cam in Fig. 2; Fig. 5, the front of three cams with intervals between them; Fig. 6, section through $t$, $u$, of Fig. 5; Fig. 7, the front of a cam with eight cut-offs; Fig. 8, the slide valve and openings to suit Fig. 7.

The first thing to be determined is the breadth of the openings in the valve seat, the space between them, and the length of the opening in the slide valve to correspond therewith. In Fig. 4, the induction passages B and C are each 1¼ inches wide, the eduction passage $a$, 2¼ inches, the space between these openings ¾ of an inch, the opening $v$, in the slide valve $3\frac{3}{4}$ inches, and the entire movement of the slide valve $3\frac{1}{2}$ inches.

Fig. 4 represents the induction passage B open and in communication with the boiler, while the other induction passage C is in communication with the open air through the eduction passage $a$, so that while steam is entering at one end of the cylinder it is escaping at the other. A movement of the slide valve $1\frac{1}{2}$ inches to the left will close the induction passage B, and prevent the steam from flowing into the cylinder, at the same time that the eduction passage is left open $\frac{1}{4}$ of an inch, which is necessary for the free exit of any steam which is left in the exhausted end of the cylinder at the latter part of the stroke. A second movement of the valve, in the same direction of 2 inches, will give full opening to the induction passage to the other end of the cylinder, and a movement of $1\frac{1}{2}$ inches to the right will close it again, and leave the induction from the other end of the cylinder open as before, and so on alternately. The cam represented in Figs. 1 and 2 will produce the movements here described. The mode of determining the dimensions and shape of this particular cam is as follows: The dimensions of the circle $m$, $g$, $w$, Fig. 1, will be determined by the size of the shaft, on which the cam is to be placed, and the required strength of the cam at its thinnest part $m$. In this case, the diameter of the circle is $5\frac{1}{2}$ inches and the whole movement of the valve being $3\frac{1}{2}$ inches, the distance between $w$ and $k$ will be the same, thus making the entire distance from $m$, to $k$, 9 inches. The cam therefore should have no one diameter greater than 9 inches. Now, in order to make a cam that will cut off the steam at one half the stroke of the piston, or thereabouts, describe from the center $i$ Fig. 1, the arc $n$, $o$, with a radius of $4\frac{1}{4}$ inches, which is $1\frac{1}{2}$ inches greater than the radius of the arc $m$, $g$, because the first or cut off movement of the valve is $1\frac{1}{2}$ inches; then with the radius $6\frac{1}{4}$ inches describe from the center $i$ the arc $k$, $l$, the radius of which is two inches greater than the radius of $n$, $o$, because the second movement of the valve which opens the induction passage C is 2 inches, and because this with the movement of $1\frac{1}{2}$ inches just described makes the entire movement of $3\frac{1}{2}$ inches. Then, with a radius of $4\frac{3}{4}$ inches, from the center $i$, describe the arc $p$, $q$, which will make the distance from $n$ to $q$, equal to 9 inches. Then, since the dimension of the cam from $m$ to $k$ is 9 inches, with that radius describe the arc $q$, $l$ from the center $n$, the arc $m$, $p$, from the center $k$, the arc $m$ $n$ from the center $l$, and the arc $o$, $k$, from the center $p$, which completes the outline of the cam, and which outline corresponds to section $p'$, $l'$, $k'$, $n'$, Fig. 3. Thus far the description of the cam, valve, valve seat, openings, &c., is the same as in the case of an ordinary cam for cutting off the steam at a portion of the stroke. But as the cam invented by me is intended to vary the time of cutting off the steam, and to change it from one portion of the stroke to another at pleasure while the engine is in motion, the following additions are made to it. It is in this instance, when it is intended to cut off steam at three different portions of the stroke, three times the usual thickness, say six inches as shown in Fig. 3, which is something more than three times the thickness of the cam yoke.

In Fig. 3, the middle portion of the cam is indicated by the letters $p''$, $e'$, $k'$, $l'$, and has its outline represented by $p$, $e$, $k$, $l$, Fig. 2, the effect of which outline pressing against the cam yokes would be to cut off the steam or close the induction passage at about $\frac{11}{16}$ of the stroke of the piston. The only difference between this and the last described outline is between $m$ and $e$, Fig. 2, the arc $d$, $e$, being described with a radius of 9 inches from the center $c$. The third part of the cam indicated by the letters $p''$ $l''$ $k'$ $m'$ Fig. 3, has its outline shown in Fig. 2 by $p$, $l$, $k$, $m$, which differs from the outline of the middle portion between the letters $d$ and $h$ only, the arc $g$, $h$, being described from the center C with a radus of $5\frac{1}{4}$ inches. This last outline closes the valve at about $\frac{7}{8}$ of the stroke of the piston and produces what is usually termed the full stroke cam, the entire movement of the valve being effected at one motion, instead of two motions, as in the cam last described. From the section exhibited in Fig. 3 it will be seen, that there is nothing to prevent the cam yoke being changed from one cam to another, and the time of cutting off the steam varied accordingly. It will also be seen that the pushing parts of all the three cams shown in Fig. 2 correspond at $h$, which is the point, at the time of whose pressure against the cam yoke the steam is let into the cylinders; so that, whichever cam is working the slide valve the steam is let on at the same period of the revolution, at the time, or before, the crank is on the dead center.

Another mode of accomplishing the object effected by the cam above described, is that already mentioned, of having separate cams with intervals between them upon the same shaft as represented in the drawing, where Fig. 5 represents the front of three cams with intervals between them, showing the outline of each, and Fig. 6 represents a section through the three cams along the line $t$, $u$, Fig. 5. But although cams thus constructed, and various other shapes and arrangements, may be used to accomplish the object in view, yet the triple cam represented in Figs. 2 and 3 is preferred on account of its simplicity and compactness, and on account of the greater facility with which the cam yoke may be shifted from one cam to another, and more especially on account of the much greater despatch and certainty with which the motion of the locomotive engine may be reversed in case of sudden emergency. When the engine is in motion, the movement is reversed by throwing the cam yoke in the direction from A to B, and upon a common eccentric or cam placed at B for the purpose, and it will be perceived that the triple cam Fig. 3 presents no inequalities that can impede the free and rapid movement of the yoke in the direction from A to B, which is not the case where the cams shown in Fig. 6, are used.

What I claim as new in the foregoing specification, and for which I ask an exclusive privilege is—

1. The connection of the power to four or more wheels and the use of much larger cylinders than usual in proportion to the weight of the engine, expressly with a view to, and in combination with, the cutting off the steam at different portions of the stroke of the piston, by means of which arrangement and combination the object, before stated, of adapting locomotive engines more perfectly to undulating and curved roads, to heavy and light loads, and to slow and fast speed, than heretofore has been effected.

2. The use of two or more cams operating on the slide valves, admitting the steam immediately to the cylinders for the purpose of cutting off the steam at different portions of the stroke of the piston, as before described, thereby economizing the steam, and consequently the fuel and better adapting the engine to the duty it may have to perform with different loads and on varying grades of the road.

The use of several cams or of one cam so constructed as to perform the office of several, as hereinbefore described, I believe to be new in itself, separate and apart from the combination herein claimed, and applicable to every species of locomotive engine with advantage, and as such I claim a patent for it. The cutting off the steam at a portion of the stroke by a cam operating on the slide valve has been long known and used on locomotive and other engines; but the change in the time of cutting off the steam as described herein, and thus being able to work the engine at full, half, or other stroke, at pleasure, while the engine is in motion, has not before been done by a cam or cams operating on the same valve. An arrangement has been used for cutting off the steam at some one portion of the stroke and changing from that to full stroke at pleasure while the engine was in motion, similar to that practised in most of the steamboats of the present day, by having a throttle or separate valve moved by a cam or eccentric or crank, and so arranged as to cut off the steam at a portion of the stroke when desired. This however does not interfere with either of my claims; inasmuch as my second claim is for a mode of effecting the cut off by means of the same valve that admits the steam to the cylinder and not a separate valve; neither does it interfere with my first claim inasmuch as the cutting off the steam and working at full stroke at pleasure has not been done in combination with the arrangement of connected wheels and large cylinders as herein described, and which arrangement in combination with the cutting off the steam as here described is of the utmose importance in effecting the object of my invention, to wit—the adaptation of the locomotive engine to undulating and curved roads more perfectly than heretofore, or to roads where considerable variation in the power of the engine is required.

ROSS WINANS.

Witnesses:
  THOS. P. JONES,
  CLEMENT T. FOOTE.